United States Patent [19]

Oike

[11] Patent Number: 4,767,664
[45] Date of Patent: Aug. 30, 1988

[54] PROCESS FOR PREPARATION OF POLYURETHANE FOAM HANDLE HAVING WOODGRAIN FINISH

[75] Inventor: Takeshi Oike, Kiryu, Japan

[73] Assignee: Izumi Jidousha K.K., Tokyo, Japan

[21] Appl. No.: 867,584

[22] Filed: May 27, 1986

[30] Foreign Application Priority Data

May 28, 1985 [JP] Japan .................................. 60-115142

[51] Int. Cl.$^4$ ............................ C08J 9/34; C08J 9/40; C08G 18/72
[52] U.S. Cl. ................................ 428/318.8; 264/45.5; 264/129; 264/DIG. 83; 521/51; 521/137
[58] Field of Search .............. 264/129, 45.5, DIG. 83; 521/51, 137; 428/318.8

[56] References Cited

U.S. PATENT DOCUMENTS 3,561,181 2/1971 Bassett ........................... 264/45.5 X
3,641,228 2/1972 Fleck .............................. 264/45.5 X
4,102,833 7/1978 Salisbury ........................ 264/129 X

*Primary Examiner*—Philip Anderson
*Attorney, Agent, or Firm*—Browdy and Neimark

[57] ABSTRACT

A process for preparing a polyurethane foam handle having a woodgrain finish is disclosed, which comprises injecting a composition comprising a polyol, a polyisocyanate, a crosslinking agent, a catalyst, a foam stabilizer and a blowing agent into a mold having a shape of a handle, blowing and curing the composition and applying a woodgrain finish coating on the formed handle. In this process, a polyol comprising 50 to 100 parts by weight of a polyether polyol having at least two OH groups in the molecule and having a molecular weight of 1,000 to 10,000 and 0 to 50 parts by weight of a polymer polyol having a hydroxyl number of 20 to 50, which is formed by graft-polymerizing a vinyl compound onto a polyether polyol, is used as the polyol, and 10 to 30 parts by weight of a polyol having 2 to 4 OH groups in the molecule and having a hydroxyl number of 800 to 2,000 is used as the crosslinking agent. The polyurethane foam handle having a woodgrain finish, which is prepared according to this process, is excellent in touch and appearance and has high impact resistance and high safety.

10 Claims, 1 Drawing Sheet

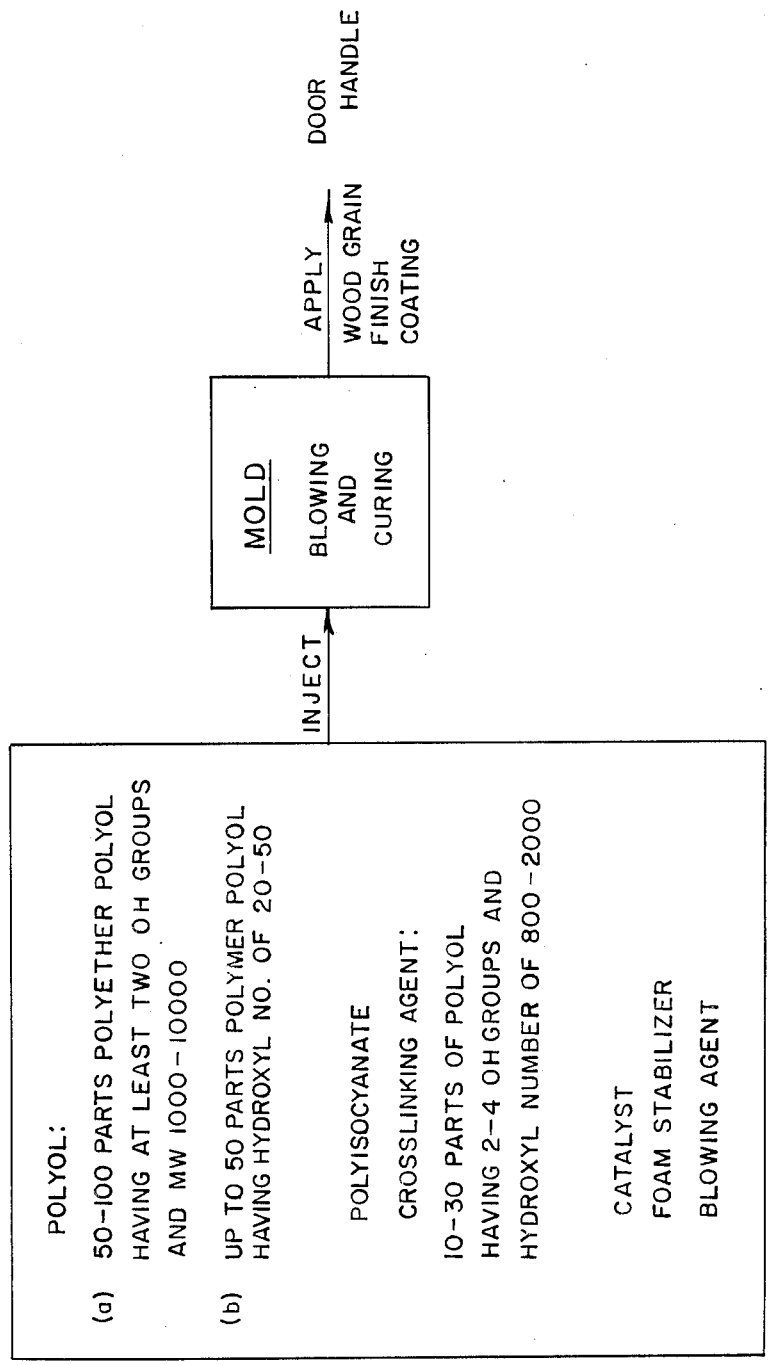

PROCESS FOR PREPARATION OF POLYURETHANE FOAM HANDLE HAVING WOODGRAIN FINISH

BACKGROUND OF THE INVENTION

(1) Field of the Invention

The present invention relates to a process for preparing a polyurethane foam handle having a woodgrain finish by injecting a polyurethane foam-forming starting material into a sealed mold and blowing and curing the starting material.

(2) Description of the Prior Art

A wooden handle has been used as a high-grade handle of a motor vehicle, but since the cost of the wooden handle is high, a plastic handle having a woodgrain finish and an appearance similar to that of the wooden handle has been broadly used. Most of conventional plastic handles having a woodgrain finish are formed of a rigid polyurethane foam, and these handles are prepared by placing a core in a mold having a woodgrain pattern formed on the surface, injecting a rigid polyurethane foam-forming starting material into the mold, blowing and curing the starting material to obtain a handle having a woodgrain pattern formed on the outer side, and finish-coating the handle to impart a woodgrain finish to the handle.

However, when these wooden handles and rigid polyurethane foam handles having a woodgrain finish are subjected to the impact test according to the method MVSS-203 of the Federal Motor Vehicle Safety Standards, cracking is caused and cracked pieces having sharp edges are formed, thus offering, a serious problem with respect to the safety.

SUMMARY OF THE INVENTION

It is therefore a primary object of the present invention to provide a polyurethane foam handle having a woodgrain finish, which is practically safe and has such a high impact resistance that cracking is not caused in the impact test according to the method of MVSS-203.

More specifically, in accordance with the present invention, there is provided a process for the preparation of a polyurethane foam handle having a woodgrain finish, which comprises injecting a composition comprising a polyol, a polyisocyanate, a crosslinking agent, a catalyst, a foam stabilizer and a blowing agent into a mold having a shape of a handle, blowing and curing the composition and applying a woodgrain finish coating on the formed handle, wherein (a) a polyether comprising 50 to 100 parts by weight of a polyether polyol having at least two OH groups in the molecule and having a molecular weight of 1,000 to 10,000 and 0 to 50 parts by weight of a polymer polyol having a hydroxyl number of 20 to 50, which is formed by graft-polymerizing a vinyl compound onto a polyether polyol, is used as the polyol, and (b) 10 to 30 parts by weight of a polyol having 2 to 4 OH groups in the molecule and having a hydroxyl number of 800 to 2,000 is used as the crosslinking agent.

BRIEF DESCRIPTION OF DRAWING

The sole FIGURE is a flow diagram of a process according to the present invention.

DETAILED DESCRIPTION OF THE PREFERRED EMBODIMENTS

As the polyol compound having at least two OH groups in the molecule and having a molecular weight of 1,000 to 10,000, there can be mentioned, for example, EP240 (supplied by Mitsui-Nisso Urethane and having a hydroxyl number of 24 and a molecular weight of 6,000), EP330C (supplied by Mitsui-Nisso Urethane and having a hydroxyl number of 35 and a molecular weight of 4,800), excenol 813 (supplied by Asahi Glass and having a hydroxyl number of 35 and a molecular weight of 6,500) and excenol 850 (supplied by Asahi Glass and having a hydroxyl number of 24 and a molecular weight of 7,000).

As the polymer polyol having a hydroxyl number of 20 to 50, which is formed by graft-polymerizing a vinyl compound to a polyether polyol, there can be mentioned, for example, POP-31/28 (supplied by Mitsui-Nisso Urethane and having a hydroxyl number of 30), POP-34/28 (supplied by Mitsui-Nisso Urethane and having a hydroxyl number of 26), excenol 910 (supplied by Asahi Glass and having a hydroxyl number of 28.2) and excenol 920 (supplied by Asahi Glass and having a hydroxyl number of 25).

As the short-chain polyol as the crosslinking agent, there can be used polyols having 2 to 4 OH groups in the molecule and a hydroxyl number of 800 to 2,000, such as ethylene glycol, diethylene glycol, glycerol, butanediol, diethanolamine and triethanolamine.

An amine catalyst and a tin catalyst are preferably used as the catalyst. For example, there can be mentioned triethylenediamine, tetramethylhexamethylenediamine, pentamethyldiethylenetriamine and dibutyltin dilaurate.

As the blowing agent, there may be used inert gasifying agents such as water and trichlorofluoromethane, and the blowing agent is preferably used in an amount of about 5 to about 15 parts by weight per 100 parts by weight of the polyol compound. The amount of the blowing agent is adjusted so that the specific gravity of the foam of the obtained handle is about 0.3 to about 1.0.

As the polyisocyanate, there can be used compounds having at least two NCO groups in the molecule, such as tolylene diisocyanate, diphenylmethane diisocyanate and prepolymers thereof. The polyisocyanate is used in such an amount that the isocyanate index is 100 to 120.

The present invention will now be described in more detail with reference to the following examples that by no means limit the scope of the invention.

EXAMPLE 1

A composition comprising 70 parts by weight of a polyol (EP330C supplied by Mitsui-Nisso Urethane), 30 parts by weight of a polymer polyol (POP31-28 supplied by Mitsui-Nisso), 12 parts by weight of a crosslinking agent A (1,4-butanediol supplied by Toyo Soda), 12 parts by weight of a crosslinking agent B (diethylene glycol supplied by Nippon Shokubai Kagaku Kogyo), 2 parts by weight of glycerol, 6 parts by weight of trichlorofluoromethane, 1.75 parts by weight of tetramethylhexamethylenediamine, 0.6 part by weight of triethylenediamine, 0.5 part by weight of a pigment and 59 parts by weight of a mixture comprising tolylene diisocyanate and diphenylmethane diisocyate in a weight ratio of 7/3 (isocyanate index: 110) was injected into a handle-shaped mold having a core inserted therein and was then blown and cured to obtain a polyurethane foam handle having a foam density of 0.7 g/cm³, a hardness (shore C) of 95° and a skin layer thickness of 3 to 4 mm The handle was subjected to the impact test according to the method of MVSS-203. Namely, a conical pendulum impact tester was used, and a sand bag filled with 70 kg of sand or lead particles was caused to impinge against the handle from a height of 1.5 m pendulously along a circular orbit under an impact load of 110 kg·m. The handle was bent but destruction of the foam was not observed.

COMPARATIVE EXAMPLE 1

In the same manner as in Example 1, a polyurethane foam handle was prepared from a composition comprising 40 parts by weight of a polyol A (HD-402 supplied by Sanyo Kasei Kogyo), 30 parts by weight of a polyol B (GP-400 supplied by Sanyo Kasei Kogyo), 10 parts by weight of polyol C (GL-3000 supplied by Sanyo Kasei Kogyo), 10 parts by weight of a polyol D (GP-250 supplied by Sanyo Kasei Kogyo), 10 parts by weight of a crosslinking agent (Q-180 supplied by Toho Kasei Kogyo), 0.5 part by weight of a silicone (SH-193 supplied by Toray Silicone), 0.4 part by weight of water, 2 parts by weight of triethylenediamine, 5 parts by weight of trichlorofluoromethane and 118 parts by weight of diphenylmethane diisocyanate (isocyanate index : 110). The obtained handle had a foam density of 0.5 g/cm³, a hardness (shore C) of 100° and no definite skin layer.

When the handle was subjected to the impact test in the same manner as in Example 1, the foam was destroyed to form pieces having sharp edges.

The polyurethane foam handle obtained according to the present invention is a semi-rigid polyurethane foam handle having a hardness comparable to or slightly lower than the hardness of a conventional rigid polyurethane foam handle and being excellent in the impact resistance. Furthermore, since the thickness of the skin layer is large, the touch of the handle prepared according to the present invention is similar to that of the conventional rigid polyurethane foam handle. Moreover, a clear woodgrain pattern can be manifested on the surface of the skin layer and a good woodgrain finish coating can be formed thereon. Therefore, according to the present invention, there can be provided a handle having a woodgrain finish comparable to or excellent over that of the conventional rigid polyurethane foam handle.

A semi-rigid polyurethane foam handle known as the soft handle has a softness and is excellent in the impact resistance. However, the hardness is insufficient and since the thickness of the surface skin layer is small, any clear woodgrain pattern cannot be given and formation of a woodgrain finish coating is difficult. Accordingly, a handle having an excellent woodgrain finish cannot be obtained.

In contrast, the handle having a woodgrain finish according to the present invention is excellent in both the touch and appearance and has such a high safety that, in the impact test according to the method of MVSS-203, cracking is not caused at all. Moreover, mass production is possible as in conventional rigid polyurethane foam handles and soft handles, and the manufacturing cost of the handle of the present invention is much lower than that of a wooden handle.

What is claimed is:

1. A process for the preparation of polyurethane foam handle having a woodgrain finish, which commprises injecting a composition comprising a polyol, a polyisocyanate, a corsslinking agent, a catalyst, a foam stabilizer and a blowing agent into a mold having a shape of a handle, and blowing and curing the composition, wherein (a) polyol comprising 50 to 100 parts by weight of polyether polyol having at least two OH groups in the molecule and having a molecular weight of 1,000 to 10,000 and 0 to 50 parts by weight of a polymer polyol having a hydroxyl number of 20 to 50 which is formed by graft-polymerizing a vinyl compound onto a polyether polyol, is used as the polyol, and (b) 10 to 30 parts by weight of a polyol having 2 to 4 OH groups in the molecule and having a hydroxyl number of 800 to 2,000 is used as the crosslinking agent, and wherein the amount of blowing agent is adjusted to provide a thick skin and a density of about 0.3 to 1.0.

2. A process according to claim 1, further comprising applying a woodgrain finish coating on the formed handle.

3. A product produced by the process of claim 1 wherein the resultant foam handle has a high impact resistant such that cracking is not caused in the impact test according to method MVSS-203 of the Federal Motor Vehicle Safety Standards.

4. A process according to claim 1 wherein said polyol compound having at least two OH groups in the molecule is selected from the group consisting of polyether polyols having an hydroxyl number of 24 and molecular weight of 6,000, an hydroxyl number of 35 and molecular weight of 4,800, and hydroxyl number of 35 and molecular weight of 6,500, an hydroxyl number of 24 and molecular weight of 7,000.

5. A process according to claim 1 wherein said polyol comprises at least about 30 parts by weight of a polymer polyol.

6. A process according to claim 1 wherein said crosslinking agent is selected from the group consisting of ethylene glycol, diethylene glycol, glycerol, butanediol, diethanolamine and triethanolamine.

7. A product obtained by the process of claim 2 and having a hard surface.

8. A process according to claim 1 wherein said skin has a thickness on the order of about 3 to 4 mm.

9. A product obtained by the process of claim 8 having a hard surface.

10. A process according to claim 1 wherein said polymer polyol having an hydroxyl number of 20 to 50 is present in an amount on the order of about 30 parts by weight.

* * * * *

UNITED STATES PATENT AND TRADEMARK OFFICE
CERTIFICATE OF CORRECTION

PATENT NO.  : 4,767,664
DATED       : August 30, 1988
INVENTOR(S) : Takeshi OIKE It is certified that error appears in the above-identified patent and that said Letters Patent is hereby corrected as shown below:

On the title page:

[73] Assignee                Insert the additional assignee,
                             -- Achilles K.K., Tokyo, Japan --

Signed and Sealed this

Twenty-fifth Day of August, 1992

Attest:

DOUGLAS B. COMER

Attesting Officer        Acting Commissioner of Patents and Trademarks